United States Patent
Ramsden

(10) Patent No.: US 8,452,002 B2
(45) Date of Patent: May 28, 2013

(54) METHODS, APPARATUS AND ARTICLES OF MANUFACTURE TO CANCEL ECHO FOR COMMUNICATION PATHS HAVING LONG BULK DELAYS

(75) Inventor: David Ramsden, Wall, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 888 days.

(21) Appl. No.: 12/562,366

(22) Filed: Sep. 18, 2009

(65) Prior Publication Data

US 2011/0069829 A1    Mar. 24, 2011

(51) Int. Cl.
*H04M 9/08*    (2006.01)
(52) U.S. Cl.
USPC .................................... 379/406.08
(58) Field of Classification Search
USPC .................................... 379/406.08
See application file for complete search history.

(56) References Cited

U.S. PATENT DOCUMENTS

| | | | |
|---|---|---|---|
| 5,343,522 A | 8/1994 | Yatrou et al. | |
| 5,400,394 A | 3/1995 | Raman et al. | |
| 5,737,410 A | 4/1998 | Vähätalo et al. | |
| 6,687,372 B1 | 2/2004 | Trump et al. | |
| 6,771,772 B1 | 8/2004 | Tanrikulu | |
| 7,107,303 B2 | 9/2006 | Kablotsky et al. | |
| 7,181,001 B2 | 2/2007 | Demirekler et al. | |
| 7,215,765 B2 | 5/2007 | Dyba et al. | |
| 2003/0235294 A1* | 12/2003 | Dyba et al. ............... | 379/406.01 |

OTHER PUBLICATIONS

Reesor, Gordon J., "Echo in the public network: What is the worst case?," Telephony Online, Jul. 24, 2003 (6 pages).
Freescale Semiconductor, "Digital Network Echo Cancellers," 2004 (2 pages).

* cited by examiner

*Primary Examiner* — Alexander Jamal
(74) *Attorney, Agent, or Firm* — Hanley, Flight & Zimmerman, LLC

(57) ABSTRACT

Example methods, apparatus and articles of manufacture to cancel echo for communication paths having long bulk delays are disclosed. A disclosed example method includes determining a first location of a first largest magnitude of a first plurality of coefficients of an echo canceller, the first plurality of coefficients separated by two or more sample intervals, and cancelling an echo contained in a received signal using a second plurality of coefficients of the echo canceller and a first offset selected based on the first location, the second plurality of coefficients separated by one sample interval.

20 Claims, 7 Drawing Sheets

US 8,452,002 B2

METHODS, APPARATUS AND ARTICLES OF MANUFACTURE TO CANCEL ECHO FOR COMMUNICATION PATHS HAVING LONG BULK DELAYS

FIELD OF THE DISCLOSURE

This disclosure relates generally to communication paths and, more particularly, to methods, apparatus and articles of manufacture to cancel echo for communication paths having long bulk delays.

BACKGROUND

An echo in a communication service is a potentially attenuated and/or potentially filtered version of what is transmitted by a device that is also received at the device. An echo may be caused by any number and/or type(s) of conditions such as, but not limited to, an impedance mismatch, an acoustic echo due to use of a speakerphone, etc. When an echo occurs with sufficient amplitude, and/or with sufficient delay and/or time offset relative to what was transmitted, the echo can be noticeable and/or annoying to a person utilizing the communication service and/or be disruptive to the ongoing communication service.

DETAILED DESCRIPTION

Example methods, apparatus and articles of manufacture to cancel echo for communication paths having long bulk delays are disclosed. A disclosed example method includes determining a first location of a first largest magnitude of a first plurality of coefficients of an echo canceller, the first plurality of coefficients separated by two or more sample intervals, and cancelling an echo contained in a received signal using a second plurality of coefficients of the echo canceller and a first offset selected based on the first location, the second plurality of coefficients separated by one sample interval.

A disclosed example apparatus includes an adaptive echo estimator to delay a transmit sample stream by an offset and to adapt a plurality of coefficients to reduce an echo, the plurality of coefficients spaced apart by a configurable number of sample intervals, a configurer, during a first time interval, to configure the adaptive echo estimator to space the plurality of coefficients two or more sample intervals apart and, during a second time interval subsequent to the first time interval, to select the offset and to configure the adaptive echo estimator with the offset and to space the plurality of coefficients one sample interval apart, and a coefficient analyzer to determine a first location of a largest magnitude of the plurality of coefficients spaced apart by the two or more sample intervals, wherein the offset is selected based on the first location.

Figure 1:
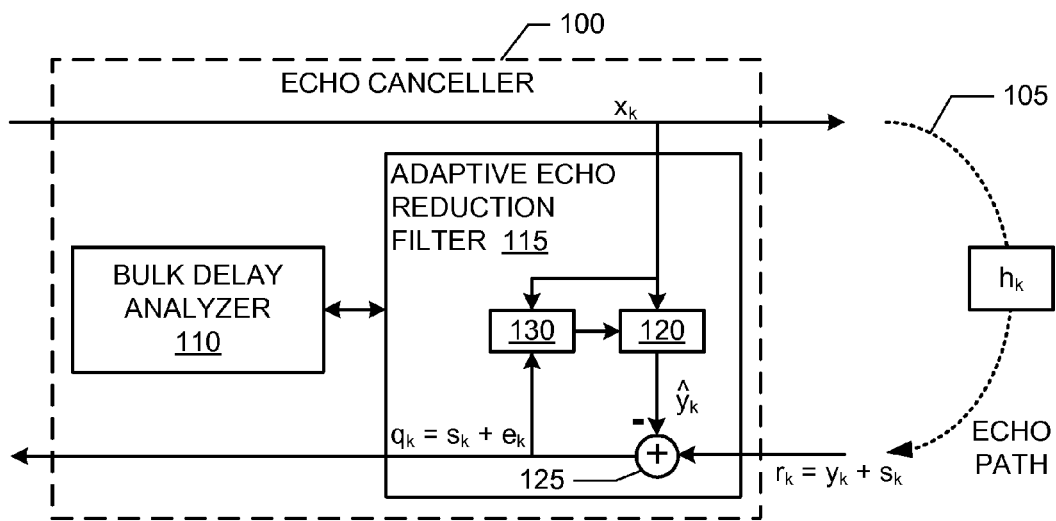
FIG. 1 is a schematic illustration of an example echo canceller constructed in accordance with the teachings of this disclosure.

FIG. 1 illustrates an example echo canceller 100 that may be used to cancel the echo $y_k$ present in a received signal $r_k$, where k indexes discrete digital samples of respective analog signals y and r. For example, the analog signal y is sampled every sampling interval $\Delta t$ (e.g., every 125 microseconds assuming a sample rate of 8000 times per second) to form the digital sample stream $y_k$. In the example of FIG. 1, the received sample stream $r_k$ includes both the undesired and/or disruptive echo $y_k$ and any other signal(s) $s_k$. The echo $y_k$ is a distorted reflection of a transmitted signal $x_k$. The other signal(s) $s_k$ could be a desired far-end signal, noise, and/or any other wanted and/or unwanted signal(s). For example, during a telephone call between first and second persons, the signal $s_k$ may represents words spoken by the first person and the undesired echo $y_k$ represents a replica of what was spoken and heard by the second person. The example echo signal $y_k$ of FIG. 1 is formed by an echo path 105, which can be represented and/or modeled as an impulse response and/or filter $h_k$. The echo signal $y_k$ can be expressed mathematically as $y_k = x_k * h_k$, where the operator * represents the convolution of the transmit sample stream $x_k$ and the echo path impulse response $h_k$.

The example echo canceller 100 of FIG. 1 may be used in any number and/or type(s) of communication system(s) and/or device(s) including, but not limited to, a teleconference bridge system, a speaker phone, a plain-old telephone service (POTS) switch, a voice over Internet protocol (VoIP) device, a VoIP router, a VoIP gateway, etc. and may be used to cancel echo for any number and/or type(s) of communication sessions and/or services such as, but not limited to, telephone calls, multi-party teleconferences, modems, etc.

As more telecommunications networks evolve to utilize VoIP technologies, increasing numbers of communication sessions (e.g., telephone calls) are exposed to communication paths having bulk and/or flat delays in excess of 128 milliseconds (ms). Some example communication paths involving more than one service provider, multiple communication networks and/or international communications have bulk and/or flat delays of more than 800 ms. The echoes associated with such communication paths are often readily perceived by users and, thus, may result in decreased customer satisfaction and/or lost revenue. Because many currently deployed echo cancellers can only cancel and/or remove the echo caused by an echo path having a span of 32 ms to 64 ms, these echo cancellers are unable to cancel the echo(s) associated with communication paths having longer bulk and/or flat delays.

To cancel the echo created by communication paths having longer bulk delays, the example echo canceller 100 of FIG. 1 includes a bulk delay analyzer 110 and an adaptive echo reduction filter 115. As described below in connection with FIGS. 2-4, the example adaptive echo reduction filter 115 of FIG. 1 is configurable to separate and/or space apart its filter coefficients and/or taps $w_n$, by any multiple d of the sampling interval $\Delta t$, including but not restricted to d=1. When the coefficients $w_n$, are spread apart by a multiple d>1 of the sampling interval $\Delta t$, the time span represented by the coefficients $w_n$, is increased by the same multiple d, albeit with less temporal resolution. The resulting sparse mode of the example adaptive echo reduction filter 115 permits the example bulk delay analyzer 110 of FIG. 1 to determine and/or identify within a longer time span the significant portion(s) of the echo path response $h_k$. For example, if the adaptive echo reduction filter 115 has enough coefficients $w_n$ spaced at the sampling interval Δt to cancel an echo caused by an echo impulse response 32 ms in length, spreading the coefficients $w_n$, apart by a factor of d=16 allows the bulk delay analyzer 110 to locate the significant portion(s) of the echo impulse response $h_k$ within a 512 ms window.

During a first and/or initial time period, the example bulk delay analyzer 110 of FIG. 1 configures the example adaptive echo reduction filter 115 into the sparse mode where its coefficients $w_n$ are spaced apart by two or more sampling intervals Δt. Once the adaptive echo reduction filter 115 has converged the sparsely spaced coefficients $w_n$, the example bulk delay analyzer 110 identifies the location L of the sparsely spaced coefficient $w_n$ having the largest energy and/or magnitude. Additionally or alternatively, the bulk delay analyzer 110 may identify the location L of a contiguous set, group and/or window of the sparsely space coefficients $w_n$ having the largest energy. The identified location L can be used to select and/or determine the offset and/or bulk and/or flat delay B present in the echo response $h_k$. In some examples, the value of B is selected such that sampling interval spaced coefficients $w_n$ are placed starting 4 ms before the identified location L and extend 12 ms beyond the identified location L, that is B=L−4 ms/Δt. Based on the selected and/or identified offset and/or bulk delay B, the bulk delay analyzer 110 re-configures the adaptive echo reduction filter 115 during a second time interval to space its coefficients $w_n$ apart by one sampling interval Δt and to compensate for the identified offset and/or bulk delay B. As discussed below in connection with FIGS. 2-4, a bulk delay element 205 implementing a delay of B sampling intervals Δt delays and/or offsets the transmit samples $x_k$ to time align the transmit samples $x_k$ with the received samples $r_k$ to compensate for the offset and/or bulk delay B. The adaptive echo reduction filter 115 re-adapts its reconfigured coefficients $w_n$ and cancels and/or removes the echo $y_k$ from the received signal $r_k$ using the re-adaptive coefficients $w_n$. An example manner of implementing the example bulk delay analyzer 110 of FIG. 1 is described below in connection with FIG. 5.

Figure 8:
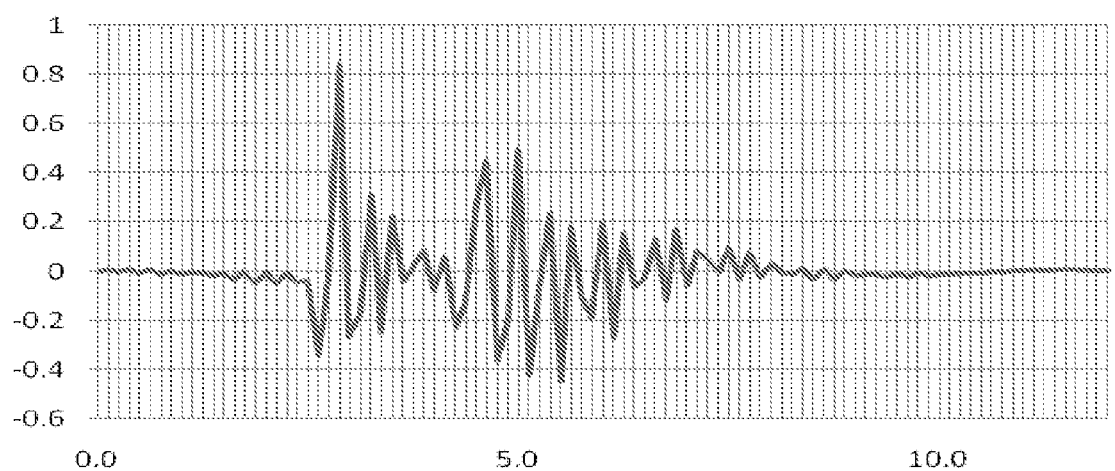
FIG. 8 is a graph illustrating an example echo path impulse response.

As shown in FIG. 8, the echo response $h_k$ may have a rapidly fluctuating impulse response, such that none of the initially sparsely spaced coefficients $w_n$ coincides with the peak of the echo response $h_k$. To overcome, reduce and/or mitigate such possibilities, the example bulk delay analyzer 110 of FIG. 1 first configures the adaptive echo reduction filter 115 to separate its coefficients $w_n$ by more than one sampling interval Δt with a first phase and/or offset, and then re-configures the adaptive echo reduction filter 115 to separate its coefficients $w_n$ by the same number of sampling intervals Δt with a second phase and/or offset different from the first phase and/or offset. For example, assuming the separation between the coefficients $w_n$ is d=8 sampling intervals Δt, the adaptive echo reduction filter 115 may be configured to adapt the coefficients $w_n$ for an offset of B=0 and for an offset of B=4. Thus, the second set of coefficients $w_n$ are located halfway between the first set of coefficients $w_n$. The locations $L_1$ and $L_2$ of the largest magnitude coefficient (i.e., the peak) in the first and second sets of coefficients $w_n$, respectively, can be compared, with the larger of the two peaks used to determine the bulk delay and/or offset B present in the echo path 105.

Additionally or alternatively, the example bulk delay analyzer 110 of FIG. 1 can identify two or more portions of the echo path 105 having significant energy. As described below in connection with FIG. 4, in such instances, the example bulk delay analyzer 110 can configure the example adaptive echo reduction filter 115 of FIG. 1 to cancel and/or remove the echo $y_k$ by splitting the coefficients $w_n$ into two or more groups of coefficients with an additional bulk delay element 405 (FIG. 4) inserted between the groups of coefficients corresponding to the separation between the significant portions of the echo path $h_k$.

Figure 2:
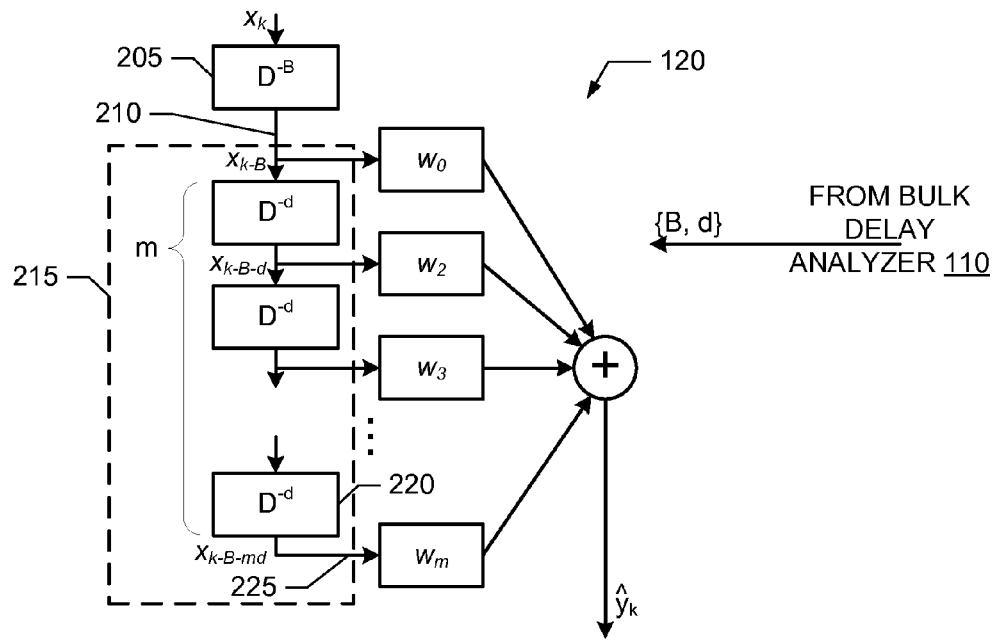
FIGS. 2-4 illustrate example manners of implementing the example adaptive echo reduction filter of FIG. 1.
Figure 3:
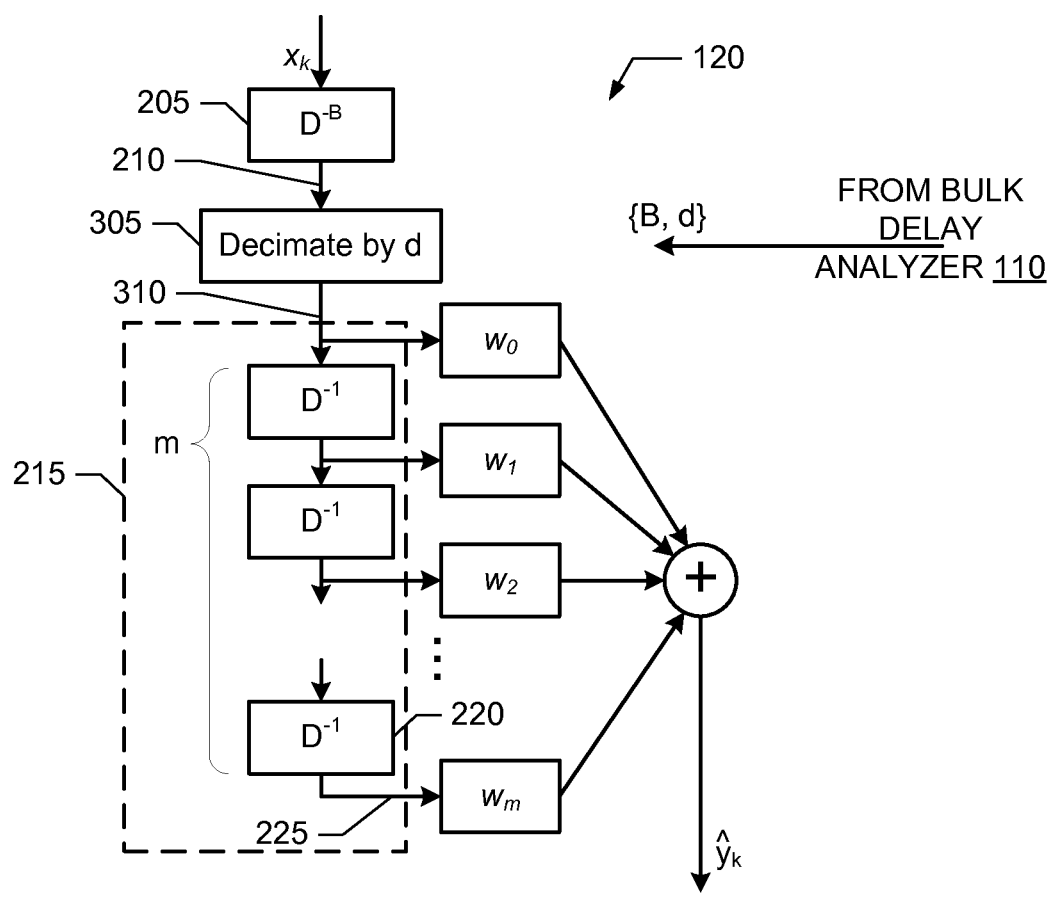
Figure 4:
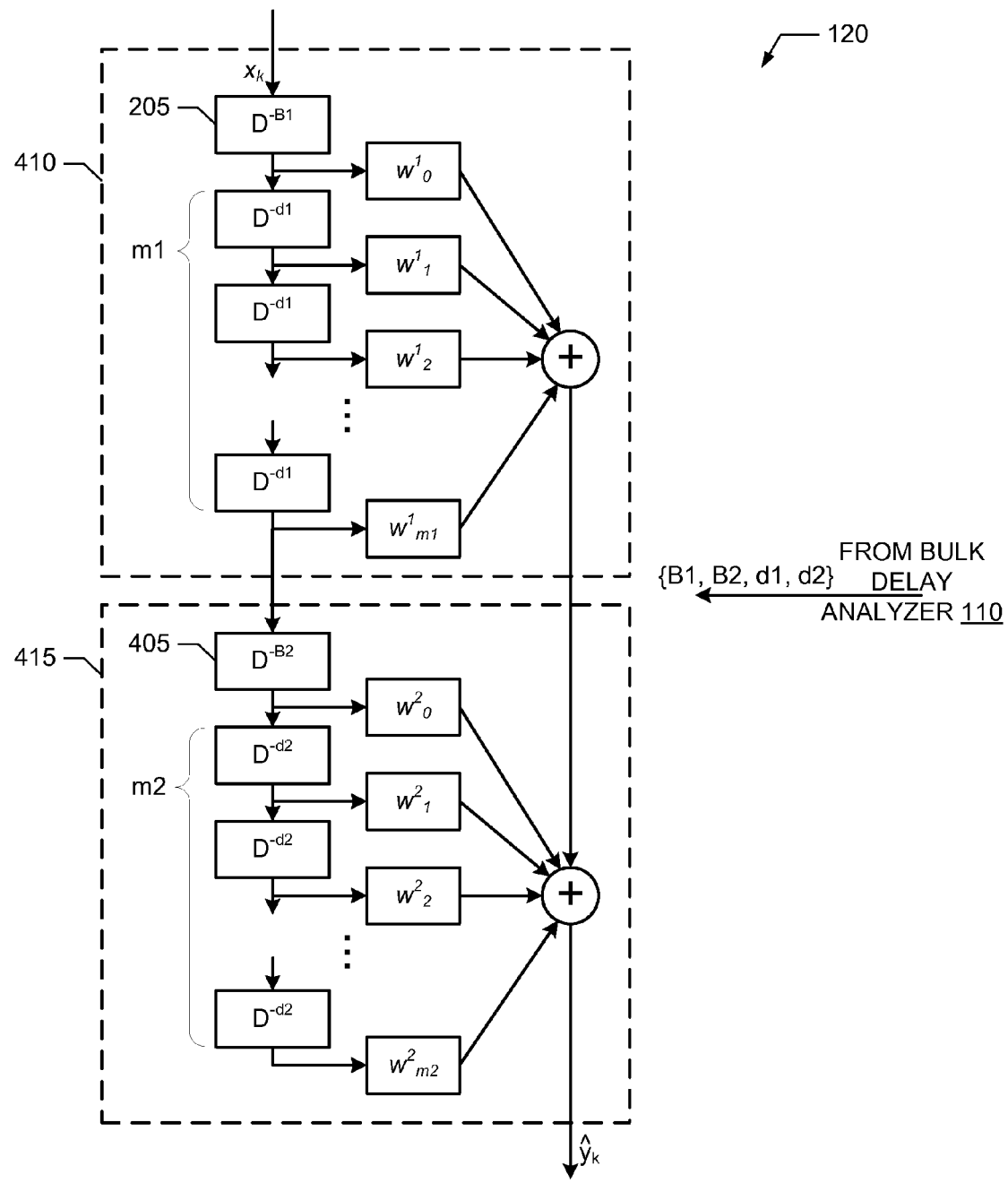

To cancel and/or remove the echo $y_k$, the example adaptive echo reduction filter 115 includes a filter 120 and a subtractor 125. As shown in FIGS. 2-4, the example filter 120 of FIG. 1 convolves the transmitted signal $x_k$ with the coefficients $w_n$ to form an estimate $\hat{y}_k$ of the echo $y_k$. The separation of the coefficients $w_n$ is configurable to any multiple d of the sampling interval Δt, including but not restricted to d=1. The example filter 120 is configurable to delay and/or offset the transmit samples $x_k$ by an amount B before they are convolved with the coefficients $w_n$. In general, the estimate $\hat{y}_k$ of the echo $y_k$ can be expressed mathematically as:

$$\hat{y}_k = \sum_{n=0}^{m} x_{k-B-(m-n)d} w_{m-n} \qquad \text{EQN (1)}$$

where m+1 is the number of coefficients of $w_n$.

While not shown in FIG. 1, the adaptive echo reduction filter 115 of FIG. 1 may include a second filter substantially similar to the filter 120. In some examples, the additional filter is configured to have sparsely spaced coefficients $w_n$ while the filter 120 is configured to have sampling interval spaced coefficients $w_n$. In such examples, the example bulk delay analyzer 110 can continue to monitor the coefficients of the additional filter while the second filter 120 cancels the echo $y_k$. The ongoing and/or continued monitoring of the coefficients $w_n$ via the additional filter may be used to identify additional portions, if any, of the echo response $h_k$ having significant energy. In some instances, such additional portions may only be detectable and/or identifiable after the energy associated with higher energy portions of the echo response $h_k$ has been removed via the filter 120.

The example subtractor 125 of FIG. 1 subtracts the estimate $\hat{y}_k$ of the echo $y_k$ from the received signal $r_k$ to form a residual signal $q_k = s_k + e_k$, where the residual echo $e_k = y_k - \hat{y}_k$. Were the coefficients $w_n$ to exactly match the echo path coefficients $h_k$, $e_k$ would equal zero and the echo $y_k$ could be completely removed from the received signal $r_k$. In practice, the adaptive echo reduction filter 115 does not completely remove the echo $y_k$ (i.e., $e_k \neq 0$) and, thus, $q_k \neq s_k$.

To adapt the echo canceller filter taps and/or coefficients $w_n$, the example adaptive echo reduction filter 115 includes a coefficient adapter 130. The example coefficient adapter 130 of FIG. 1 adapts the coefficients $w_n$ to minimize the residual echo $e_k$. In some examples, the coefficient adapter 130 adapts the coefficients $w_n$ to minimize the mean of the squares of the sample stream $q_k$. For example, each coefficient $w_n$ can be updated using the following mathematical expression $$w_{n,k} = w_{n,k} - \mu q_k x_k, \qquad \text{EQN (2)}$$

where μ is a constant that controls the speed of the coefficient adaptation.

As shown in EQNS (1) and (2), the complexity (e.g., expressed in multiply and accumulates per second) associated with the adaptive echo reduction filter 115 is proportional to the number m of the coefficients $w_n$. Thus, to accommodate a large bulk delay of 512 ms the complexity of a conventional 32 ms echo canceller would have to increase by a factor of 16. However, using the bulk delay analysis methods, apparatus and articles of manufacture described herein, the bulk delay of the echo path 105 can be determined within a 512 ms time span using d=16 without increasing the complexity of the adaptive echo reduction filter 115 beyond that of a 32 ms echo canceller.

While an example echo canceller 100 has been illustrated in FIG. 1, the elements illustrated in FIG. 1 may be combined, divided, re-arranged, eliminated and/or implemented in any way. Further, the example bulk delay analyzer 110, the example adaptive echo reduction filter 115, the example filter 120, the example subtractor 125, the example coefficient adapter 130 and/or, more generally, the example echo canceller 100 of FIG. 1 may be implemented by hardware, software, firmware and/or any combination of hardware, software and/or firmware. Thus, for example, any of the example bulk delay analyzer 110, the example adaptive echo reduction filter 115, the example filter 120, the example subtractor 125, the example coefficient adapter 130 and/or, more generally, the example echo canceller 100 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the example echo canceller 100 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/or processors. For example, the echo canceller 100 may include a non-linear processor.

FIG. 2 illustrates an example manner of implementing the example filter 120 of FIG. 1. To compensate for the offset and/or bulk delay B present in the echo impulse response $h_k$, the example filter 120 of FIG. 2 includes the example bulk delay element 205. The example bulk delay element 205 of FIG. 1 delays the transmit sample stream $x_k$ by a configurable integer number B of samples to form a delayed sample stream 210.

To compute a convolution of the delayed sample stream 210 and the coefficients $w_n$, the example filter 120 of FIG. 2 includes a tap delay line 215. The example tap delay line 215 of FIG. 2 includes a plurality of delay elements, one of which is designated at reference numeral 220. The example delay elements 220 of FIG. 2 are arranged serially and successively delay the delayed sample stream 210 by a configurable integer number of samples d.

In the example filter 120 of FIG. 2, outputs of the example delay elements 205 and 210 (one of which is designated at reference numeral 225) are multiplied by respective ones of the coefficients $\{w_0, \ldots, w_m\}$, and added together to form the estimate $\hat{y}_k$ of the echo $y_k$.

As shown in FIG. 2, the values of d and B are provided to the filter 120 by the bulk delay analyzer 110. When d is configured to have a value of 1, the example filter 120 of FIG. 2 implements a conventional filter having sampling interval spaced coefficients $w_n$. When d>1, the example filter 120 implements a sparse filter having coefficients $w_n$ that are spaced apart and/or separated by d sampling intervals $\Delta t$.

FIG. 3 illustrates another example manner of implementing the example filter 120 of FIG. 1. Because elements of the example filter 120 of FIG. 3 are identical to those discussed above in connection with the example filter 120 of FIG. 2, the description of identical elements is not repeated here. Instead, identical elements are designated with identical reference numerals in FIGS. 2 and 3, and the interested reader is referred back to the descriptions presented above in connection with FIG. 2 for a complete description of those identically numbered elements.

In the illustrated example of FIG. 3, the tap delay line delay elements 220 are configured for d=1, and a decimator 305 is used to decimate the delayed sample stream 210 to form a decimated sample stream 310. The example decimator 305 of FIG. 3 decimates the delayed sample stream 210 by keeping every $d^{th}$ sample of the delayed sample stream 210 and discarding the intervening samples. As with the example filter 120 of FIG. 2, when d is configured to have a value of 1, the filter 120 of FIG. 3 implements a conventional filter having sampling interval spaced coefficients $w_n$. When d>1, the example filter 120 of FIG. 3 implements a sparse filter having coefficients $w_n$ that are spaced apart and/or separated by d sampling intervals $\Delta t$.

FIG. 4 illustrates yet another example manner of implementing the example filter 120 of FIG. 1. In the illustrated example of FIG. 4, the filter 120 is split into two sub-filters 410 and 415. The example sub-filters 410 and 415 of FIG. 4 are implemented substantially as described above in connection with FIG. 2. Alternatively, the sub-filters 410 and 415 can be implemented substantially as described above in connection with FIG. 3.

The example sub-filters 410 and 415 of FIG. 4 can be separately configured with bulk delays B1 and B2, respectively, and can space their respective coefficients $w_n$ apart by separately configured separations d1 and d2, respectively.

While the example sub-filters 410 and 415 of FIG. 4 are arranged serially, they may alternatively be implemented in parallel. In some examples, the bulk delay analyzer 110 can configure the sub-filters 410 and 415 for serial and/or parallel operation. Thus, the example sub-filters 410 and 415 can be operated to cancel the echo $y_k$ associated with different portions of the echo response $h_k$, and/or can be operated such that the filter 410 cancels and/or removes the echo $y_k$ while the filter 415 is used simultaneously to determine the bulk delay B1 used to configure the filter 410.

While example manners of implementing the example filter 120 of FIG. 1 are illustrated in FIGS. 2-4, one or more of the elements illustrated in FIGS. 2-4 may be combined, divided, re-arranged, omitted, eliminated and/or implemented in any other way. Further, the elements shown in FIGS. 2-4 may be implemented by hardware, software, firmware and/or any combination of hardware, software and/or firmware. Thus, for example, any of the depicted elements may be implemented by one or more circuit(s), programmable processor(s), ASIC(s), PLD(s) and/or FPLD(s), etc. Further still, the filter 120 may include elements instead of, or in addition to, those illustrated in FIGS. 2-4 and/or may include more than one of any or all of the illustrated elements.

Figure 5:
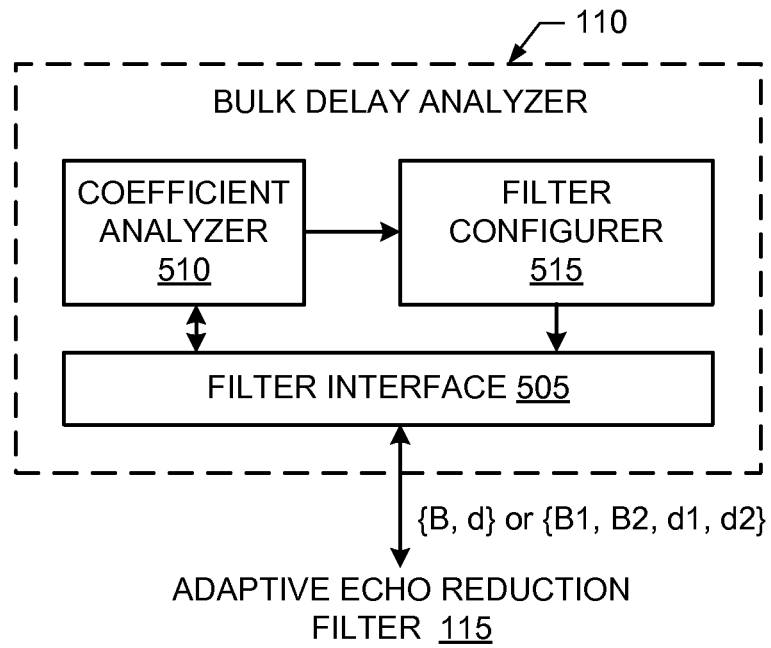
FIG. 5 illustrates an example manner of implementing the example bulk delay analyzer of FIG. 1.

FIG. 5 illustrates an example manner of implementing the example bulk delay analyzer 110 of FIG. 1. To interface with the example adaptive echo reduction filter 115, the example bulk delay analyzer 110 of FIG. 5 includes a filter interface 505. Using any number and/or type(s) of message(s), format(s) and/or protocol(s), the example filter interface 505 of FIG. 5 configures the adaptive echo reduction filter 115 with the parameters {B, d} and/or {B1, d1, B2, d2}. The example filter interface 505 is also to obtain and/or read the current values of the coefficients $w_n$ from the adaptive echo reduction filter 115.

To identify and/or determine the location L of a largest magnitude coefficient $w_n$, the example bulk delay analyzer 110 of FIG. 5 includes a coefficient analyzer 510. The example tap analyzer 510 compares the magnitudes of coefficients $w_n$ obtained via the echo estimator interface 505 to determine the location L of the largest magnitude coefficient $w_n$. Additionally and/or alternatively, the example coefficient analyzer 510 determines and/or identifies the location L of the largest contiguous set, group and/or window of the coefficients $w_n$.

To determine how to configure the example adaptive echo reduction filter 115, the example bulk delay analyzer 110 includes a filter configurer 515. During a first and/or initial time period, the example filter configurer 515 configures the example adaptive echo reduction filter 115 via the filter interface 505 into the sparse mode where its coefficients $w_n$ are spaced apart by two or more sampling intervals $\Delta t$. Once the adaptive echo reduction filter 115 has converged the sparsely spaced coefficients $w_n$, the example filter configurer 515 directs the coefficient analyzer 515 to identify the location L, as described above. Based on the identified location L, the filter configurer 515 determines the offset and/or bulk delay B and re-configures the adaptive echo reduction filter 115 during a second time interval to space its coefficients $w_n$ apart by one sampling interval $\Delta t$ and to compensate for the identified offset and/or bulk delay B. In some examples, the value of B is selected such that sampling interval spaced coefficients $w_n$ are placed starting 4 ms before the identified location L and extend 12 ms beyond the identified location L, that is B=L−4 ms/$\Delta t$.

As described above, the example filter configurer 515 of FIG. 5 may configure a second filter and/or a portion of the example filter 120 to facilitate bulk delay determination, and/or may configure the example filter 120 to cancel the echo associated with two portions of the echo response $h_k$.

While an example manner of implementing the example bulk delay analyzer 110 of FIG. 1 has been illustrated in FIG. 5, one or more of the interfaces, modules, elements and/or devices illustrated in FIG. 5 may be combined, divided, re-arranged, omitted, eliminated and/or implemented in any other way. Further, the example filter interface 505, the example coefficient analyzer 501, the example filter configurer 515 and/or, more generally, the example bulk delay analyzer 110 of FIG. 5 may be implemented by hardware, software, firmware and/or any combination of hardware, software and/or firmware. Thus, for example, any of the example filter interface 505, the example coefficient analyzer 501, the example filter configurer 515 and/or, more generally, the example bulk delay analyzer 110 may be implemented by one or more circuit(s), programmable processor(s), ASIC(s), PLD(s) and/or FPLD(s), etc. Further still, the bulk delay analyzer 110 may include interfaces, modules, elements and/or devices instead of, or in addition to, those illustrated in FIG. 5 and/or may include more than one of any or all of the illustrated interfaces, modules, elements and/or devices.

Figure 6:
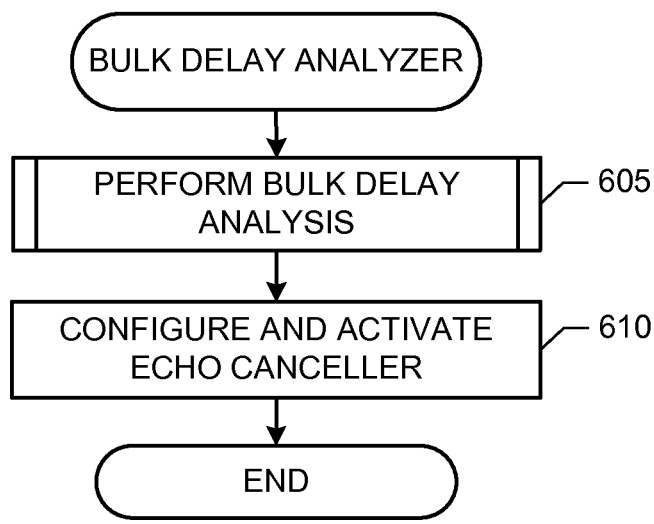
FIGS. 6 and 7 are flowcharts representative of example processes that may be carried out to implement the example bulk delay analyzer of FIGS. 1 and 5 and/or, more generally, the example echo canceller of FIG. 1.
Figure 7:
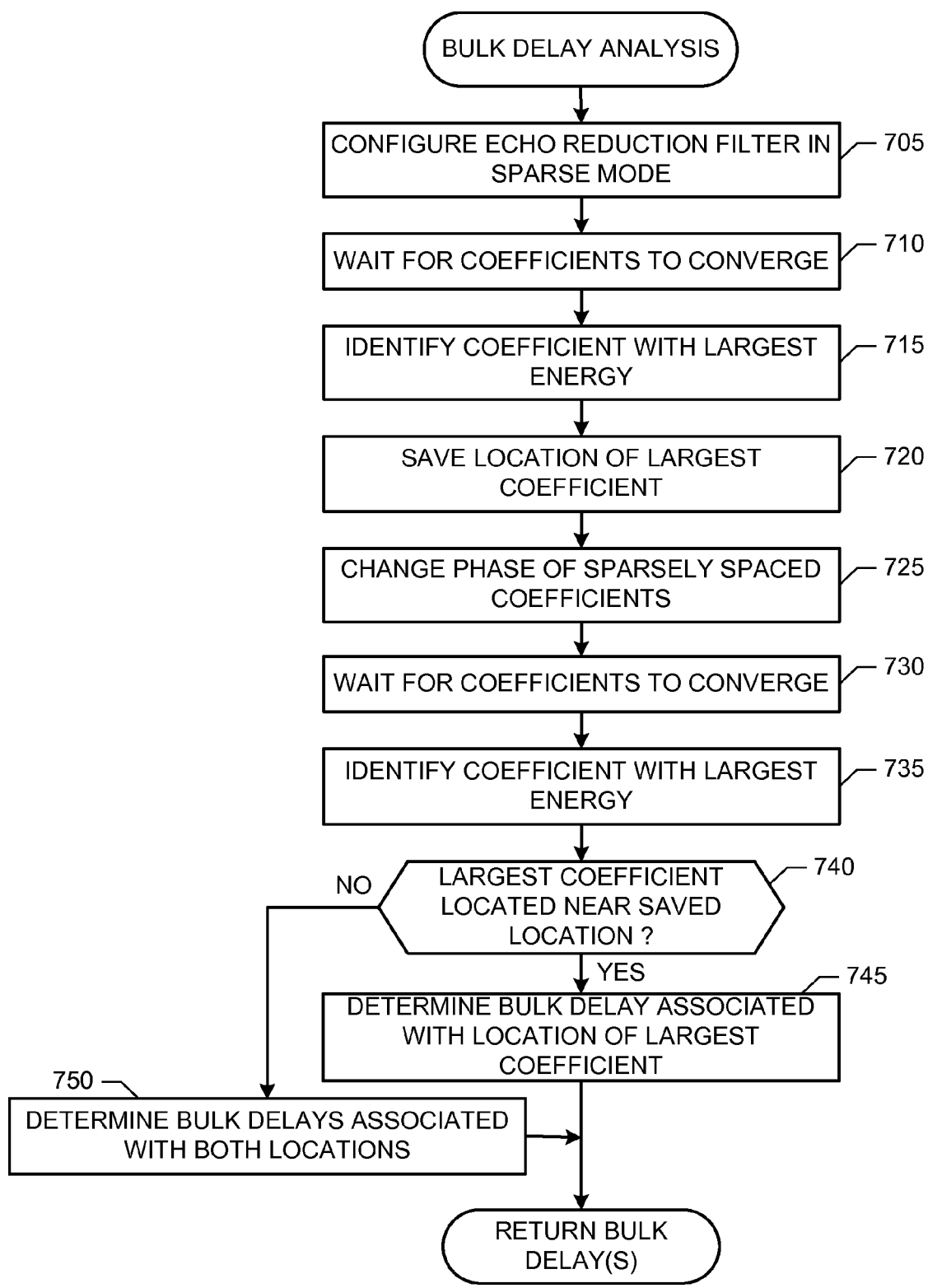

FIGS. 6 and 7 are flowcharts representative of example processes that may be carried out to implement the example bulk delay analyzer 110 of FIGS. 1 and 5. The example processes of FIGS. 6 and 7 may be carried out by a processor, a controller and/or any other suitable processing device. For example, the processes of FIGS. 6 and 7 may be embodied in coded instructions stored on any article of manufacture, such as any tangible computer-readable medium. Example tangible computer-readable medium include, but are not limited to, a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 9). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 6 and 7 may be implemented using any combination(s) of ASIC(s), PLD(s), FPLD(s), discrete logic, hardware, firmware, etc. Also, some or all of the example processes of FIGS. 6 and 7 may instead be implemented manually or as any combination of any of the foregoing techniques, for example, any combination of firmware, software, discrete logic and/or hardware. Further, many other methods of implementing the example operations of FIGS. 6 and 7 may be employed. For example, the order of execution of the blocks may be changed, and/or one or more of the blocks described may be changed, eliminated, sub-divided, or combined. Additionally, any or all of the example processes of FIGS. 6 and 7 may be carried out sequentially and/or carried out in parallel by, for example, separate processing threads, processors, devices, discrete logic, circuits, etc.

The example process of FIG. 6 begins with the example bulk delay analyzer 110 determining the offset and/or bulk delay B present in the echo response $h_k$ by, for example, carrying out the example process of FIG. 7 (block 605). Based on the identified offset and/or bulk delay B, the example bulk delay analyzer 110 configures the example adaptive echo reduction filter 115 to cancel the echo $y_k$ (block 610). Control then exits from the example process of FIG. 6.

The example process of FIG. 7 begins with the example filter configurer 515 configuring the echo reduction filter 115 into sparse mode, as described above (block 705). The coefficient analyzer 510 waits for the sparsely spaced coefficients $w_n$ to converge (block 710) and then identifies the coefficient $w_n$ with the largest energy and/or magnitude (block 715). The filter configurer 515 saves the location L of the largest coefficient $w_n$ (block 720).

The example filter configurer 515 configures the echo reduction filter 115 into sparse mode with a different phase, as described above (block 725). The coefficient analyzer 510 waits for the sparsely spaced coefficients $w_n$ to converge (block 730) and then identifies the coefficient $w_n$ with the largest magnitude and/or energy (block 735).

If the location of the largest coefficient $w_n$ is near the saved location L (block 740), the filter configurer 515 selects an offset and/or bulk delay B based on the larger of these two largest coefficients (block 745). Control exits from the example process of FIG. 7 returning the selected bulk delay B.

If the location of the largest coefficient $w_n$ is not near the saved location L (block 740), the filter configurer 515 selects an offset and/or bulk delay B1 based on the saved location L and selects an offset and/or bulk delay B2 based on the location of the other largest coefficient (block 750). Control exits from the example process of FIG. 7 returning the selected bulk delays B1 and B2.

Figure 9:
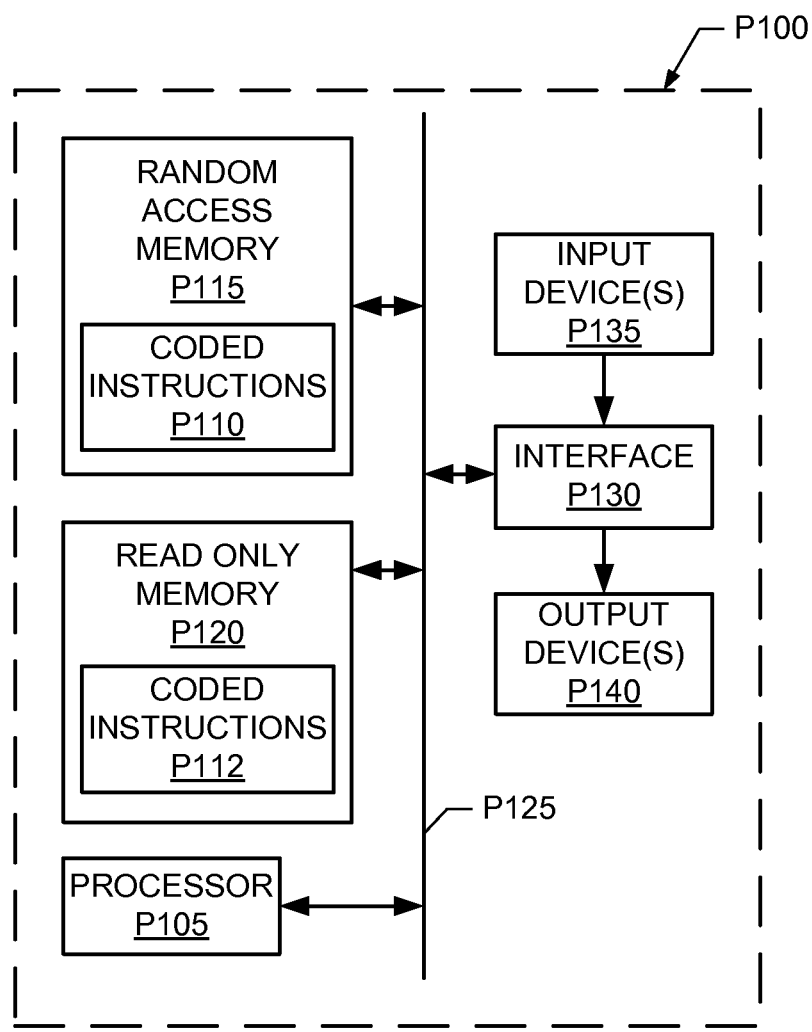
FIG. 9 is a schematic illustration of an example processor platform that may be used and/or programmed to carry out the example processes of FIGS. 6 and 7, and/or to implement any of all of the methods, apparatus and articles of manufacture disclosed herein.

FIG. 9 is a schematic diagram of an example processor platform P100 that may be used and/or programmed to implement the example bulk delay analyzer 110 and/or, more generally, the example echo canceller 100 of FIGS. 1-5. For example, the processor platform P100 can be implemented by one or more general-purpose processors, processor cores, microcontrollers, etc.

The processor platform P100 of the example of FIG. 7 includes at least one general purpose programmable processor P105. The processor P105 executes coded and/or machine-accessible instructions P110 and/or P112 stored in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 6 and 7 to implement the example methods, apparatus and articles of manufacture described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). The example memory P115 and/or P120 may be used to, for example, implement and/or store the coefficients $w_n$, the delay elements 205, 220 and 405, and/or the parameters d, B, d1, B1, d2 and/or B2.

The processor platform P100 also includes an interface circuit P125. The interface circuit P125 may be implemented by any type of interface standard, such as an external memory interface, serial port, general-purpose input/output, etc. One or more input devices P130 and one or more output devices P130 are connected to the interface circuit P125. The input devices P130 and/or output devices P130 may be used to, for example, implement the example filter interface 505 of FIG. 5.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    determining a first location of a first largest magnitude of a first plurality of coefficients of a first phase, the first plurality of coefficients separated by at least two sample intervals;
    determining a second location of a second largest magnitude of a second plurality of coefficients of a second phase different than the first phase, the second plurality of coefficients separated by at least two sample intervals;
    comparing a difference between the first and second locations to a threshold; and
    when the difference is greater than the threshold, cancelling an echo contained in a received signal using a first offset and a second offset, the first offset being selected based on the first location, the second offset being selected based on the second location.

2. A method as defined in claim 1, further comprising:
    adapting the first plurality of coefficients based on the echo contained in the received signal during a first time interval; and
    adapting the second plurality of coefficients based on the echo contained in the received signal during a second time interval subsequent to the first time interval.

3. A method as defined in claim 2, further comprising adapting a third plurality of coefficients based on the echo contained in the received signal during a third time interval, the second time interval subsequent to the third time interval.

4. A tangible machine-readable storage medium comprising instructions that, when executed, cause a machine to perform a method comprising:
    determining a first location of a first largest magnitude of a first plurality of coefficients of a first phase, the first plurality of coefficients separated by at least two sample intervals;
    determining a second location of a second largest magnitude of a second plurality of coefficients of a second phase different than the first phase, the second plurality of coefficients separated by at least two sample intervals;
    comparing a difference between the first and second locations to a threshold; and
    when the difference is greater than the threshold, cancelling an echo contained in a received signal using a first offset and a second offset, the first offset being selected based on the first location, the second offset being selected based on the second location.

5. A tangible machine readable storage medium as defined in claim 4, wherein the method further comprises:
    adapting the first plurality of coefficients based on the echo contained in the received signal during a first time interval; and
    adapting the second plurality of coefficients based on the echo contained in the received signal during a second time interval subsequent to the first time interval.

6. A tangible machine readable storage medium as defined in claim 5, wherein the method further comprises adapting the third plurality of coefficients based on the echo contained in the received signal during a third time interval, the second time interval subsequent to the third time interval.

7. A tangible machine readable storage medium as defined in claim 4, wherein the method further comprises, when the difference is less than the threshold, cancelling the echo contained in the received signal using a third offset selected based on one of the first and second locations.

8. A tangible machine readable storage medium as defined in claim 7, wherein the method comprises cancelling the echo contained in the received signal using the third offset selected based on the one of the first and second locations by:
    identifying a greater one of the first largest magnitude and the second largest magnitude; and
    basing the third offset on the greater one of the first and second largest magnitudes.

9. A tangible machine readable storage medium as defined in claim 4, wherein the method comprises cancelling the echo contained in the received signal using the first and second offsets by:
    using a third plurality of coefficients to cancel the echo in association with the first offset; and
    using a fourth plurality of coefficients to cancel the echo in association with the second offset.

10. A tangible machine readable storage medium as defined in claim 4, wherein the method further comprises cancelling the echo contained in the received signal by using a third plurality of coefficients separated by one sample interval.

11. An apparatus comprising:
    a memory having machine readable instructions stored thereon; and
    a processor to execute the instructions to perform operations comprising:
        determining a first location of a first largest magnitude of a first plurality of coefficients of a first phase, the first plurality of coefficients separated by at least two sample intervals;

determining a second location of a second largest magnitude of a second plurality of coefficients of a second phase different than the first phase, the second plurality of coefficients separated by at least two sample intervals;

comparing a difference between the first and second locations to a threshold; and when the difference is greater than the threshold, cancelling an echo contained in a received signal using a first offset and a second offset, the first offset being selected based on the first location, the second offset being selected based on the second location.

12. An apparatus as defined in claim 11, the operations further comprising, when the difference is less than the threshold, cancelling the echo contained in the received signal using a third offset selected based on one of the first and second locations.

13. An apparatus as defined in claim 12, wherein cancelling the echo contained in the received signal using the third offset selected based on the one of the first and second locations comprises:

identifying a greater one of the first largest magnitude and the second largest magnitude; and basing the third offset on the greater one of the first and second largest magnitudes.

14. An apparatus as defined in claim 11, wherein cancelling the echo contained in the received signal using the first and second offsets comprises:

using a third plurality of coefficients to cancel the echo in association with the first offset; and using a fourth plurality of coefficients to cancel the echo in association with the second offset.

15. An apparatus as defined in claim 11, the operations further comprising:

adapting the first plurality of coefficients based on the echo contained in the received signal during a first time interval; and adapting the second plurality of coefficients based on the echo contained in the received signal during a second time interval subsequent to the first time interval.

16. An apparatus as defined in claim 15, the operations further comprising adapting a third plurality of coefficients based on the echo contained in the received signal during a third time interval, the second time interval subsequent to the third time interval.

17. A method as defined in claim 1, further comprising, when the difference is less than the threshold, cancelling the echo contained in the received signal using a third offset selected based on one of the first and second locations.

18. A method as defined in claim 17, wherein cancelling the echo contained in the received signal using the third offset selected based on the one of the first and second locations comprises:

identifying a greater one of the first largest magnitude and the second largest magnitude; and basing the third offset on the greater one of the first and second largest magnitudes.

19. A method as defined in claim 1, wherein cancelling the echo contained in the received signal using the first and second offsets comprises:

using a third plurality of coefficients to cancel the echo in association with the first offset; and using a fourth plurality of coefficients to cancel the echo in association with the second offset.

20. A method as defined in claim 1, wherein cancelling the echo contained in the received signal comprises using a third plurality of coefficients separated by one sample interval.

* * * * *